Sept. 26, 1967        P. E. STOFT        3,344,350
MEASUREMENT METER
Original Filed April 9, 1964
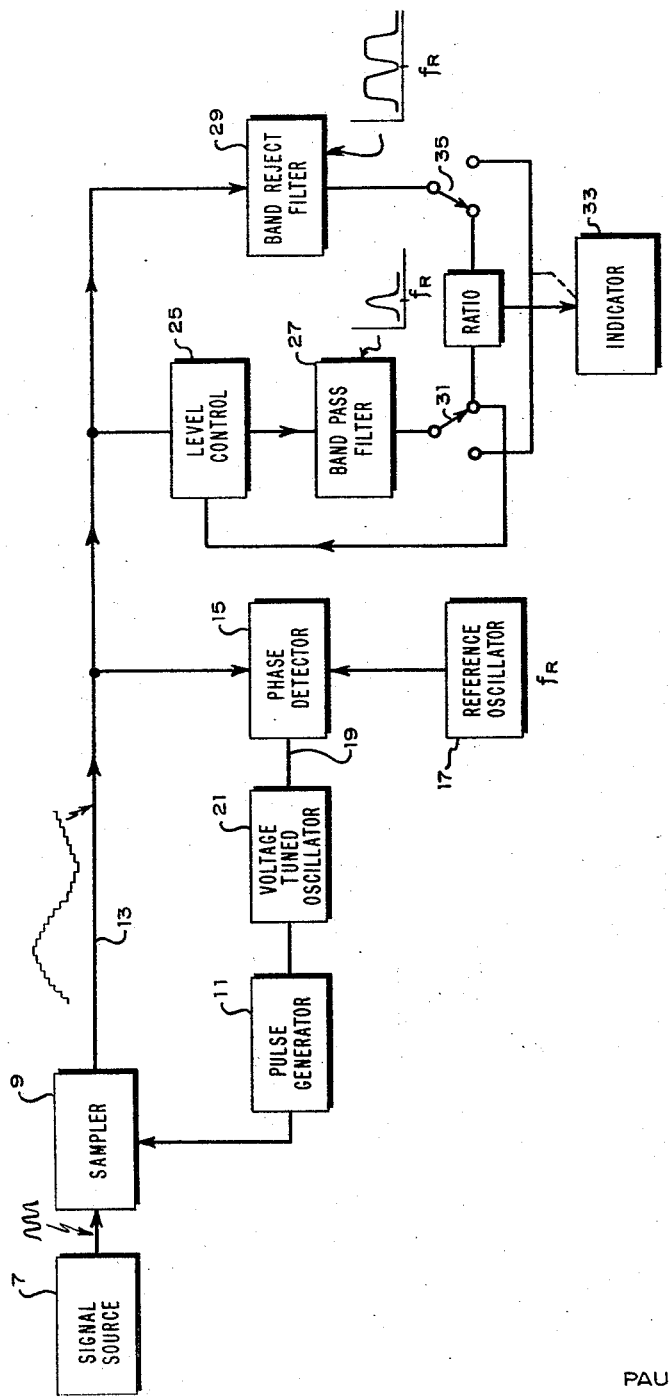
INVENTOR
PAUL E. STOFT
BY *A. C. Smith*
ATTORNEY

3,344,350
MEASUREMENT METER
Paul E. Stoft, Menlo Park, Calif., assignor to Hewlett-Packard Company, Palo Alto, Calif., a corporation of California
Continuation of application Ser. No. 358,489, Apr. 9, 1964. This application Nov. 9, 1966, Ser. No. 607,095
5 Claims. (Cl. 324—77)

This is a continuation application of patent application Ser. No. 358,489 filed on Apr. 9, 1964, now abandoned, by Paul E. Stoft.

This invention relates to a meter circuit which provides an indication of the sideband power relative to carrier power and of the harmonic components of the carrier of a modulated signal under examination.

It is an object of the present invention to provide a high frequency modulation meter which provides an indication of the relative amplitudes of the carrier and sidebands of a modulated signal.

It is another object of the present invention to provide an improved modulation meter which provides an accurate indication of the level of amplitude modulation present on a carrier signal.

It is still another object of the present invention to provide a circuit for measuring harmonic components of high frequency signals.

In accordance with the illustrated embodiment of the present invention a high frequency sampler such as the type described in U.S. Patent No. 3,241,076, issued on Mar. 15, 1966 to Kay B. Magleby and Wayne M. Grove, is connected to receive a signal under examination for producing a stairstep signal from a plurality of sample pulses occurring at a selected rate and having amplitudes related to the amplitude of the signal under examination at each sample instant. The stairstep signal, which has the same general waveshape as the signal under examination, is compared in a phase detector with a low frequency reference signal to produce a voltage which controls the repetition rate of the sample pulses. The output of the circuit is the stairstep signal having the same fixed frequency as the reference oscillator for all frequencies of the signal under examination. Harmonic components and sideband signals in the input frequency are preserved and appear in the output respectively as harmonics and sidebands of the reference oscillator frequency. A band-pass filter having a frequency response centered about the reference frequency passes signal related to the carrier signal and a band-reject filter having a frequency response centered about the reference frequency passes signal related to sidebands about the carrier signal. The signals at the outputs of the filters are suitably combined to produce an indication of percent modulation. A band-pass filter having a frequency response centered about a selected harmonic of the reference frequency may also be used to determine the harmonic components of the signal under examination.

Other and incidental objects of the present invention will be apparent from a reading of this specification and an inspection of the accompanying drawing which shows a block diagram of the circuit of the present invention.

In the drawing, a sampler 9 is connected to receive the signal under examination from source 7 (having a frequency typically of the order of one kilomegacycle per second) and a train of pulses from pulse generator 11. Sampler 9 produces a sample pulse at each occurrence of a pulse from generator 11. These sample pulses have amplitudes which are related to the amplitude of the signal from source 7 and which are stored by the sampler 9 between successive sampling instants. The output of sampler 9 is thus a stairstep signal having the same general waveshape as the signal from source 7. The stairstep signal is compared with the output of reference oscillator 17 in the detector 15 which produces a control voltage on line 19 that is proportional to the phase relationship between the reference frequency and the fundamental component of the stairstep signal. This control voltage is applied to the voltage-tuned oscillator 21 to vary the frequency of its output, which output is applied to pulse generator 11 to vary the repetition rate of pulses applied to the sampler 9. Phase lock is thus maintained between the reference oscillator 17 and the fundamental component of the stairstep signal produced by sampler 9 in response to pulses applied thereto from generator 11. The output of the phase-locked loop appears on line 13 as a fixed frequency signal which is applied through level control 25 to band-pass filter 27.

The present circuit preserves the information about harmonics and sidebands close to the carrier frequency component of the signal under examination by reproducing on output line 13 the harmonics and sidebands of the reference oscillator 17 at related amplitudes. The band-pass filter 27 and the band-reject filter 29 have frequency responses which are typically one cycle wide centered about the reference frequency. This may be accomplished using well-known notch circuits, crystal filters or switching modulator circuits operating in synchronism with the reference frequency from oscillator 17. Signal at the output of band-pass filter 27 is thus related to the level of the carrier frequency component only of the signal under examination and signal at the output of band-reject filter 29 is related to the level of the sidebands close to the carrier frequency component of the signal under examination. The signal at the output of sampler 9 is applied through level control 25 to the band-pass filter 27. Level control 25 receives the output of filter 27 to maintain this output at a selected level which then serves as a reference level for determining the ratio between the outputs of filters 27 and 29. The ratio of these outputs represents the modulation level of the carrier frequency component of the signal under examination, which ratio is displayed by indicaotr 33 typically as a percent modulation figure. Total sideband power may be displayed if indicator 33 is adapted to respond to the RMS value of applied signals.

The output of either one of the filters 25 and 27 may also be connected directly to the indicator 33 as through switches 31 and 35 for providing an indication of carrier level only or of sideband component level only. Level control 25 is switched out of the circuit so that the output of filter 27 is related to the amplitude of the frequency component in the signal on line 13 passed by the filter. Any one of a number of band-pass filters 27, each having a frequency response centered about a successive harmonic of the reference frequency from oscillator 17 may also be connected in the circuit to provide information about harmonic content of the signal under examination. Similarly, any one of a number of band-reject filters, each having a rejection notch centered about successive harmonics of the reference frequency may be connected in the circuit to provide information about sidebands of harmonics of the signal under examination. The harmonic content and sidebands of harmonics of the signal under examination may also be measured using band-pass and band-reject filters centered about the reference frequency by adjusting oscillator 17 to produce sub-harmonics of the reference frequency.

I claim:
1. A signal-measuring circuit comprising:
   a source of trigger pulses;
   a sampler connected to receive a signal under examination and the trigger pulses from said source for producing a signal at the output of said sampler having an amplitude related to the amplitude of the signal under examination at each occurrence of a trigger pulse;

a source of reference frequency;

means connected to the source of reference frequency and to the output of the sampler for producing a control signal related to the phase relationship between the reference frequency and the selected frequency component of the signal at the output of said sampler;

means connected to apply said control signal to said source of trigger signals for altering the repetition rate of said trigger pulses;

a band-filter having a transmission characteristic substantially centered about the reference frequency;

indicating means; and circuit means including said filter connected to the output of said sampler for applying the signal appearing thereon to said indicating means.

2. A signal-measuring circuit as in claim 1 wherein: said band-filter has a passband transmission characteristic.

3. A signal-measuring circuit as in claim 1 wherein: said band-filter has a band-rejection transmission characteristic.

4. A signal-measuring circuit as in claim 1 wherein: said band-filter has a passband frequency characteristic centered about the reference frequency; said circuit means includes another filter for rejecting said reference frequency and for passing signals having frequencies about said reference frequency; and means connected to the outputs of the filters for applying to said indicating means a signal proportional to a selected algebraic combination of signals appearing on the outputs of said filters.

5. A signal-measuring circuit as in claim 1 wherein: said band-filter includes a first filter having in the frequency response thereof a pass band about said reference frequency;

a second filter having in the frequency response thereof a rejection band about said reference frequency;

circuit means connected to said sampler for applying the signal at the output thereof to the first and second filters;

indicating means; and means connected to said filters for applying a signal to said indicating means proportional to the ratio of the signals at the outputs of said filters.

No references cited.

RUDOLPH V. ROLINEC, *Primary Examiner.*

P. F. WILLE, *Assistant Examiner.*